Figure 1:
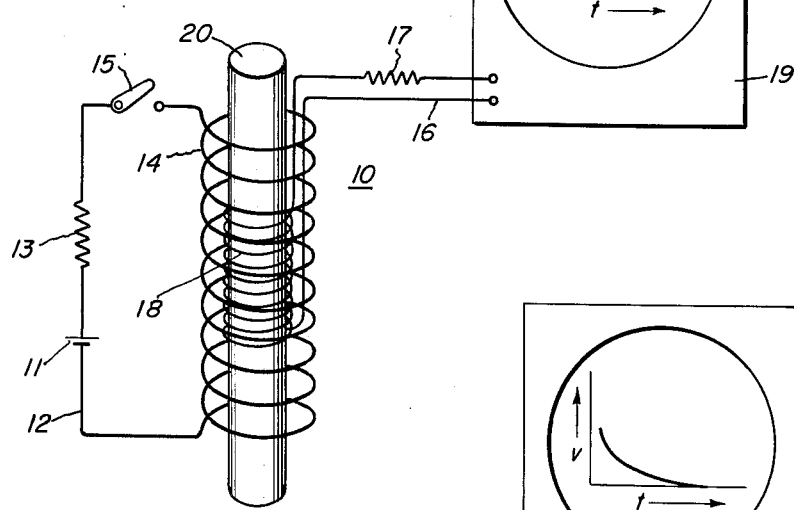

Feb. 8, 1966   C. P. BEAN ET AL   3,234,458
METHOD FOR DETERMINING RESISTIVITY OF A METAL
Filed Nov. 28, 1960

Inventors:
Charles P. Bean,
Ralph W. DeBlois,
Loyd B. Nesbitt,
by Paul R. Webb, II
Their Attorney.

United States Patent Office 3,234,458
Patented Feb. 8, 1966

3,234,458
METHOD FOR DETERMINING RESISTIVITY OF A METAL
Charles P. Bean and Ralph W. De Blois, Schenectady, and Loyd B. Nesbitt, Alplaus, N.Y., assignors to General Electric Company, a corporation of New York
Filed Nov. 28, 1960, Ser. No. 71,969
2 Claims. (Cl. 324—40)

This invention relates to methods for determining resistivity of a metal and more particularly to eddy-current methods for determining resistivity of a metal at a temperature substantially below 273° K.

Resistivity determinations at low temperatures would be desirable to determine purity of metals. At temperatures substantially below 273° K., resistivity of a metal is proportional to purity, but at room temperature, resistivity is not sensitive to purity. Thus, low temperature resistivity determinations would have application in such operations as zone-refining and copper dip-forming of rod stock.

Present resistivity measurement methods include applying leads to a uniformly thick metallic member, passing a direct current through the member, and measuring the resistance by instrument. The resistivity is then calculated since the dimensions of the member are known. An alternating magnetic field has also been employed to a uniformly thick metallic member to measure its resistance. However, this measurement, from which a resistivity value is calculated subsequently, provides only the skin resistance of the member. Eddy-current measurements have been employed at room temperature to determine the permeability-conductivity product or either conductivity or permeability if the other is known.

Low resistivity of pure metals at very low temperatures makes conventional resistivity measurements difficult and subject to a high degree of error unless the samples are long, thin wires. It would be desirable to determine the resistivity of thick or unconventionally shaped specimens. It would also be advantageous to eliminate damage or contamination caused by affixing leads to the member. Additionally, it would be desirable to obtain local or segmented resistivity values rather than an average value for the member.

It is an object of our invention to provide a method for determining the low temperature resistivity of a metal by employing eddy-currents.

It is another object of our invention to provide a method for determining the low temperature resistivity of a non-uniform diameter metal.

It is another object of our invention to provide a method for determining local low temperature resistivities of a metallic member.

It is a further object of our invention to provide a method for determining the resistivity ratio of a metal.

It is a still further object of our invention to provide a method for determining the purity of a metal.

In carrying out our invention in one form, the decay time of eddy-currents is determined for a metal member subjected to an abrupt change of magnetic field at a temperature above 77° K. The metal member is also subjected to an abrupt change of magnetic field at a temperature below 77° K. and the time is measured for the decay of the eddy-currents. A time ratio is determined from the voltage decay times. The time ratio is then multiplied by the standard resistivity value for the member to provide the resistivity of the member at its measured low temperature which resistivity is proportional to the purity of the metal.

Figure 2:
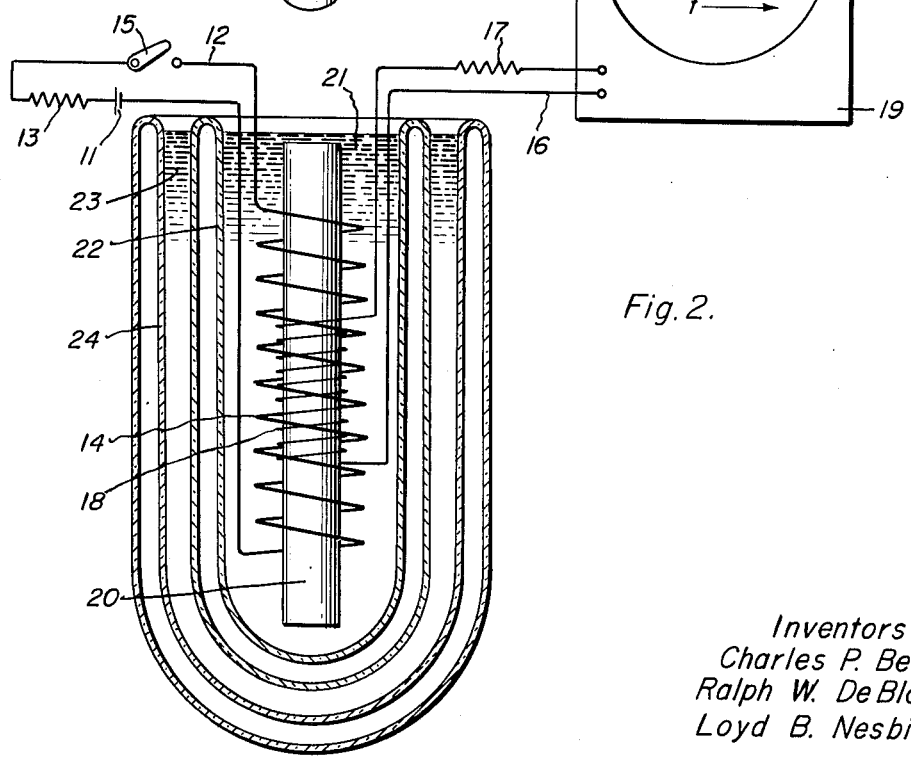

These and various other objects, features, and advantages of the invention will be better understood from the following description taken in connection with the accompanying drawing in which:

FIGURE 1 is a schematic view of a room temperature measuring apparatus which is employed in the method of the present invention; and FIGURE 2 is a schematic view of a low temperature measuring apparatus which is also employed in the method of the present invention.

In FIGURE 1 of the drawing, room temperature measuring apparatus is shown generally at 10 which comprises a power source such as a battery 11 connected to a primary circuit 12 including a resistance 13, a plurality of turns 14 and a switch 15. A secondary circuit 16 which includes a resistance 17, and a plurality of turns 18 is connected to a display device 19, such as an oscilloscope. Turns 14 of primary circuit 12 and turns 18 of secondary circuit 16 surround but do not contact a metal member 20 to be measured at temperatures above 273° K.

In FIGURE 2, low temperature measuring apparatus is shown which comprises power source 11 connected to primary circuit 12 including resistance 13, turns 14 and switch 15. Secondary circuit 16, which includes resistance 17, and turns 18, is connected to display device 19. Turns 14 primary circuit 12 and turns 18 of secondary circuit 16 surround but do not contact metal member 20 to be measured at a temperature substantially below 273° K. Member 20 surrounded by turns 14 and 18 is immersed in liquid helium 21 contained in an insulated vessel 22. Liquid nitrogen 23 surrounds vessel 22 and is contained in an insulated vessel 24.

We discovered that the low temperature resistivity of a uniform or non-uniform diameter metal member can be determined by determining the time of decay of eddy-currents in the metal member subjected to an abrupt change of magnetic field at a temperature above 77° K., and subjected to an abrupt change of magnetic field at a low temperature substantially below 77° K. If the member is of a uniform diameter, the decay time for eddy-currents at a temperature above 77° K. is calculated or measured. If the member is of non-uniform diameter, the decay time is measured. Such measurement consists of subjecting the member to an abrupt change of magnetic field and measuring the time of the decay of the voltage induced by the changing eddy-currents. A time ratio is determined from the decay times at a temperature above 77° K. and at a low temperature below 77° K. The resulting time ratio is multiplied by the standard resistivity value of the metal to provide its low temperature resistivity which resistivity is proportional to its purity. We discovered further that since the secondary or pickup coil is primarily sensitive to the metallic segment enclosed thereby, local or segmented measurements are accomplished. Additionally, the metallic member can be moved within the secondary coil to produce a series of voltage decays. Such voltage traces can be photographed for subsequent time ratio and resistivity calculations. We found that our method of determining the low temperature resistivity of metals was suitable with metals having a diameter greater than $5 \times 10^{-3}$ centimeters.

In the operation of apparatus 10 shown in FIGURE 1 of the drawing, a unidirectional current is passed from battery 11 through primary circuit 12 including resistance 13 and its associated turns 14 by closing switch 15. The current is passed for a sufficient time for essentially complete flux penetration of metallic member 20. The current is then interrupted by opening switch 15. Voltage from secondary coil 16 caused by emergence of flux from member 20 is noted on oscilloscope 19. Resistance 17 is included in secondary coil 16 to damp out ringing oscillations. The time is measured for the decay of the voltage induced by the changing eddy-currents.

In the operation of the apparatus in FIGURE 2 of the drawing, member 20 surrounded by turns 14 and 18 is immersed in liquid helium 21 contained in vessel 22. Vessel 24 containing liquid nitrogen 23 surrounds vessel 22 to maintain helium 21 in its liquid state. While liquid helium is employed for the low temperature measurement in the apparatus shown in FIGURE 2, other cryogenic techniques can be employed. A unidirectional current is passed from battery 11 through primary coil 12 including resistance 13 and its associated turns 14 by closing switch 15. The current is passed for a sufficient time for essentially complete flux penetration of metallic member 20. The current is then interrupted by opening switch 15. Voltage from secondary coil 16 caused by emergence of flux from member 20 is noted on oscilloscope 19. The time is measured for the decay of the voltage induced by the changing eddy-currents.

The resulting time ratio from measuring the voltage decay at a temperature above 77° K. and at a temperature below 77° K. is multiplied by the standard resistivity value at the higher temperature to determine the resistivity of the metal member at its known low temperature. The low temperature resistivity is generally proportional to the purity, in order of magnitude; 1 percent of impurity gives a resistance of $1 \times 10^{-6}$ ohm-centimeter or 1 micro-ohm-centimeter. Thus, the room temperature resistivity multiplied by the time ratio provides an approximate measure of impurity.

Examples of low temperature resistivities of various metals which are determined in accordance with the methods of the present invention are as follows:

In these examples, the apparatus of FIGURES 1 and 2 is employed. The voltage decay times are measured with the same circuit parameters at room temperature and at 4.2° K. with liquid helium. The room temperature resistivity values are handbook values.

EXAMPLE I

*Material.*—Copper.
*Room temperature measurement.*—Voltage decayed from ½ volt to ¼ volt in 0.2 millisecond.
*4.2° K. measurement.*—Voltage decayed from ½ millivolt to ¼ millivolt in 0.2 second.
*Time ratio.*—1/1000.
*Resistivity at 20° C.*—1.72 micro-ohm-centimeters.
*Resistivity at 4.2° K.*—$1.72 \times 10^{-3}$ micro-ohm-centimeters.

EXAMPLE II

*Material.*—Aluminum.
*Room temperature measurement.*—Voltage decayed from 0.2 volt to 0.1 volt in 0.0002 second.
*4.2° K. measurement.*—Voltage decayed from 20 microvolts to 10 microvolts in 2 seconds.
*Time ratio.*—1/10,000.
*Resistivity at 20° C.*—2.83 micro-ohm-centimeters.
*Resistivity at 4.2° K.*—$2.83 \times 10^{-4}$ micro-ohm-centimeters.

EXAMPLE III

*Material.*—Tungsten.
*Room temperature measurement.*—Voltage decayed from 0.1 volt to 0.05 volt in 0.1 millisecond.
*4.2° K. measurement.*—Voltage decayed from 0.01 volt to 0.005 volt in 1.0 millisecond.
*Time ratio.*—1/10.
*Resistivity at 20° C.*—5.5 micro-ohm-centimeters.
*Resistivity at 4.2° K.*—0.55 micro-ohm-centimeters.

While other modifications of this invention and variation of method which may be employed within the scope of the invention have not been described, the invention is intended to include such that may be embraced within the following claims.

What we claim as new and desire to secure by Letters Patent of the United States is:

1. A method of measuring the resistivity of a metal at a low temperature below 77° K. which comprises measuring the time of decay of the voltage induced by the changing eddy-currents in a metal member subjected to an abrupt change of magnetic field at a temperature above 77° K. at which temperature the resistivity of the metal is known, subjecting said metal member to an abrupt change in a magnetic field at a temperature below 77° K., measuring the time of decay of the voltage induced by the changing eddy-currents, determining a ratio from the time of voltage decay above 77° K. over the time of voltage decay below 77° K., and determining from the product of the ratio and the known higher temperature resistivity value the resistivity of said metal at its temperature below 77° K.

2. A method of measuring the resistivity of a metal at a low temperature below 77° K. which comprises subjecting a metal member to an abrupt change of magnetic field at a temperature above 77° K. at which temperature the resistivity of the metal is known, measuring the time of decay of the voltage induced by the changing eddy-currents, subjecting said metal member to an abrupt change of magnetic field at temperature below 77° K., measuring the time of decay of the voltage induced by the changing eddy-currents, determining a ratio from the time of voltage decay above 77° K. over the time of voltage decay below 77° K., and determining from the product of the ratio and the known higher temperature resistivity value the resistivity of said metal at its temperature below 77° K.

References Cited by the Examiner
UNITED STATES PATENTS
3,090,910   5/1963   Moran _____ 324—40

OTHER REFERENCES

Dauphinee et al., Rev. Sci. Instrum., volume 26, July 1955, pages 660–664.

Rorschach et al., Phys. Rev., volume 81, page 467 (1951).

WALTER L. CARLSON, *Primary Examiner.*
LLOYD McCOLLUM, *Examiner.*
A. E. SMITH, F. A. SEEMAR, R. J. CORCORAN,
*Assistant Examiners.*